United States Patent [19]

Matsuyama et al.

[11] 4,408,024
[45] Oct. 4, 1983

[54] METHOD FOR THE HEAT REMOVAL FROM POLYMERIZATION REACTOR

[75] Inventors: Kiyoshi Matsuyama; Hitoshi Hashimoto, both of Niihama, Japan

[73] Assignee: Sumitomo Chemical Co., Ltd., Osaka, Japan

[21] Appl. No.: 232,486

[22] Filed: Feb. 9, 1981

[30] Foreign Application Priority Data

Feb. 7, 1980 [JP] Japan .................................. 55-14536

[51] Int. Cl.³ ............................................. C08F 6/06
[52] U.S. Cl. .................................... 526/67; 422/138; 526/68
[58] Field of Search ............................. 526/67, 68, 70

[56] References Cited

U.S. PATENT DOCUMENTS

| 3,349,070 | 10/1967 | Thayer | 526/67 |
| 3,502,638 | 3/1970 | Rätzsch | 526/67 |
| 3,635,931 | 1/1972 | Davison | 526/67 |
| 3,770,709 | 11/1973 | Tegge | 526/67 |
| 3,785,430 | 1/1974 | Pfeiffer | 165/1 |
| 4,058,652 | 11/1977 | Smith | 526/68 |
| 4,061,848 | 12/1977 | Sistig | 526/61 |

FOREIGN PATENT DOCUMENTS 991397 5/1965 United Kingdom .................. 526/67

Primary Examiner—C. A. Henderson
Attorney, Agent, or Firm—Sughrue, Mion, Zinn, Macpeak & Seas

[57] ABSTRACT

In polymerizing an olefin, for example, in a polymerization reactor with a reflux condenser, a gas mixture withdrawn from the polymerization reactor is first washed before it reaches the heat transfer surface of the reflux condenser to remove active catalyst particles and polymer particles entrained therein and then condensed to obtain a condensed liquid, and the condensed liquid is returned to the polymerization reactor whereby the heat generated in the polymerization reactor is efficiently removed without causing any clogging of pipes, etc.

1 Claim, 11 Drawing Figures

METHOD FOR THE HEAT REMOVAL FROM POLYMERIZATION REACTOR

FIELD OF THE INVENTION

This invention relates to an improved method and apparatus for heat removal from a polymerization reactor with a reflux condenser for polymerization of olefins in a low boiling point hydrocarbon solvent by the use of an olefin polymerization catalyst.

BACKGROUND OF THE INVENTION

Recently, with an increase in the amount of polyolefins being produced, there has been a tendency toward a large volume polymerization reactor to be employed or to increase the amount of polyolefins being produced per polymerization reactor. For heat removal from the polymerization reactor, therefore, various methods as well as the usual heat removal method using a jacket have been developed, including a method in which an internal cooler (e.g., a plate cooler, a coil cooler, etc.) is mounted in the polymerization reactor, and a method in which a reflux condenser is used for the heat removal by circulating a liquid phase portion in the polymerization reactor into an external cooler. Such a method using the reflux condenser is described in British Pat. No. 991,397, U.S. Pat. Nos. 3,785,430 and 4,061,848, etc.

The method using the reflux condenser, however, suffers from the disadvantage that when the reflux condenser is continuously used, active catalyst particles and polymer particles, both of which particles are entrained in gas to be condensed, deposit on the heat transfer surface of the reflux condenser to form scales such as films, bulk materials and the like of polymers, which results in a reduction of the heat removal ability. Furthermore, these scales give rise to various problems, that is to say, when they are locally stripped off, they clog a flow path through which the condensed liquid returns to the polymerization reactor, enter the polymerization reactor to adversely affect the quality of polyolefin products, and clog a conduit through which the liquid phase portion in the polymerization reactor is withdrawn. In order to remove such problems, it is necessary to wash the heat transfer surface of the reflux condenser at about 2 or 3 month intervals.

For washing the heat transfer surface, it is necessary to separate the reflux condenser from the polymerization reactor by stopping the polymerization or by reducing extremely the amount of polyolefins being produced. This leads to a marked reduction in productivity.

SUMMARY OF THE INVENTION

An object of this invention is to provide a method and apparatus for heat removal from a polymerization reactor with a reflux condenser which substantially or completely prevents the formation of polymer scales on the heat transfer surface of the reflux condenser.

It has now been found that the above object is attained by providing a washing system for washing a gas mixture withdrawn from the polymerization reactor before it reaches the heat transfer surface of the reflux condenser.

This invention, therefore, relates to a method and apparatus for heat removal from a polymerization reactor with a reflux condenser, in which an unsaturated hydrocarbon monomer having 2 to 8 carbon atoms is polymerized in an inert hydrocarbon or the liquefied monomer having 3 to 8 carbon atoms as a solvent is polymerized in the presence of an olefin polymerization catalyst. This is accomplished by introducing a gas mixture withdrawn from the polymerization reactor into the reflux condenser where the gas mixture is separated into a condensed liquid and an uncondensed gas and returning the condensed liquid to the polymerization reactor by gravity flow or with a pump and the uncondensed gas into the liquid phase in the polymerization reactor by the use of a compressor, wherein the gas mixture from the polymerization reactor is brought into countercurrent contact with the condensed liquid and/or the solvent to be supplied to the polymerization reactor before the gas mixture reaches the heat transfer surface of the reflux condenser to remove active catalyst particles and polymer particles, both of which particles are entrained in the gas to be condensed.

BRIEF DESCRIPTION OF THE ACCOMPANYING DRAWINGS

FIGS. 1.A to 1.F each illustrates a washing system in which a condensed liquid is used as a washing liquid;

FIGS. 2.A to 2.C each illustrates a combination of a washing system in which a solvent to be supplied to a polymerization reactor is used as a washing liquid and a reflux condenser;

FIG. 3 is a flow diagram of a combination of a polymerization reactor and an apparatus for the heat removal from the polymerization reactor; and FIG. 4 is a sectional view of a reflux condenser containing therein a washing system.

In FIGS. 1 to 4, numeral 1 means a polymerization reactor, 2 a washing apparatus, 3 a reflux condenser, 4 a piping through which the gas mixture is introduced into the washing apparatus, 5 a piping through which the gas mixture withdrawn from the washing apparatus is introduced into the reflux condenser, 6 a piping through which the uncondensed gas mixture flows, 7 a piping through which the condensed liquid is withdrawn from the reflux condenser, 8 a piping through which the liquid is withdrawn from the washing apparatus, 9 a piping through which the washing liquid is introduced into the washing apparatus, 10 a piping through which the cooling water is supplied, 11 a control valve for cooling water, 12 a heat transfer tube of the condenser, 13 a washing apparatus (tray), 14 a washing apparatus (down comer), 15 a compressor for circulating the uncondensed gas mixture, and 16 a temperature regulator, respectively.

DETAILED DESCRIPTION OF THE INVENTION

As the reflux condenser which can be used in practicing this invention, the usual multitubular heat exchangers of either vertical type or horizontal type can be used.

A washing apparatus which can be used in this invention is a usual gas-liquid contacter. Preferred examples are trays such as a sieve tray, a turbogrid tray, a ripple tray, etc., scrubbers such as a pibo disc scrubber, a cyclone scrubber, etc., and spray towers.

The reflux condenser and the washing apparatus may be installed separately or combined together to provide a system in which the washing apparatus is contained in the lower portion of the reflux condenser. These embodiments will be hereinafter explained by reference to the accompanying drawings.

FIGS 1.A to 1.F each illustrates an embodiment in which the condensed liquid is used as the washing liquid; that is, FIG. 1.A shows an embodiment in which a vertical type reflux condenser is combined with an independent washing apparatus; FIG. 1.B an embodiment in which a horizontal type reflux condenser is combined with an independent washing apparatus; FIG. 1.C an embodiment in which a horizontal type reflux condenser contains therein a washing apparatus; FIG. 1.D an embodiment in which a vertical type reflux condenser contains a washing apparatus; FIG. 1.E an embodiment in which a vertical type reflux condenser is combined with a washing apparatus directly mounted on a polymerization reactor; and FIG. 1.F an embodiment in which a vertical type condenser containing therein a washing apparatus is directly mounted on a polymerization reactor.

Figure 1A:
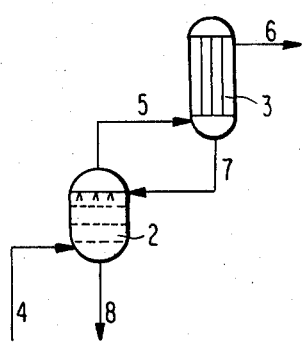
Figure 1B:
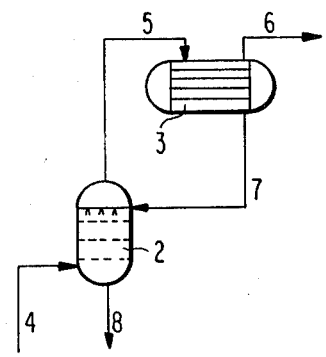
Figure 1C:
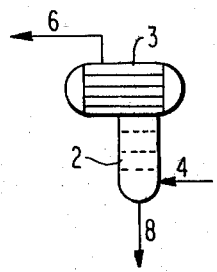
Figure 1D:
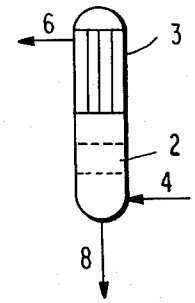
Figure 1E:
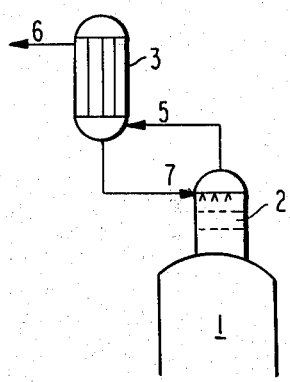
Figure 1F:
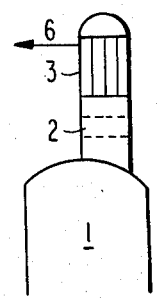
Figure 2A:
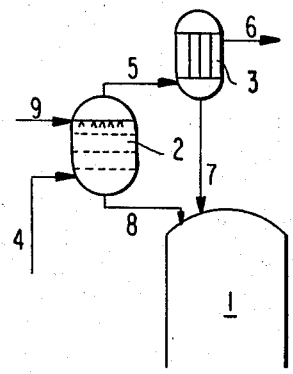
Figure 2B:
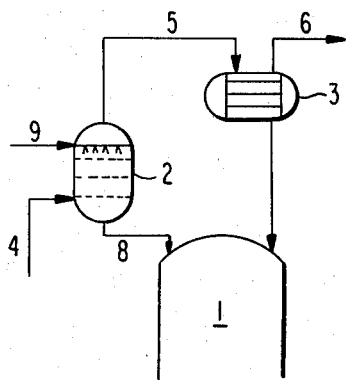
Figure 2C:
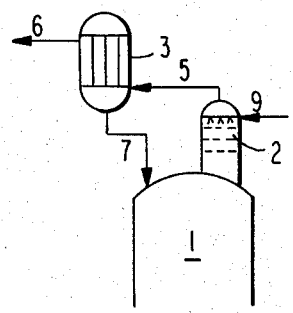

FIGS. 2.A to 2.C each illustrates an embodiment in which the solvent to be supplied to the polymerization reactor is used as the washing liquid; that is, FIG. 2.A shows an embodiment in which a vertical type reflux condenser is combined with an independent washing apparatus; FIG. 2.B an embodiment in which a horizontal type reflux condenser is combined with an independent washing apparatus; and FIG. 2.C an embodiment in which a vertical type reflux condenser is combined with a washing apparatus directly mounted on a polymerization reactor.

It is to be noted that this invention is not limited to the embodiments as illustrated above.

This invention will be hereinafter described in greater detail by reference to FIGS. 3 and 4.

Figure 3:
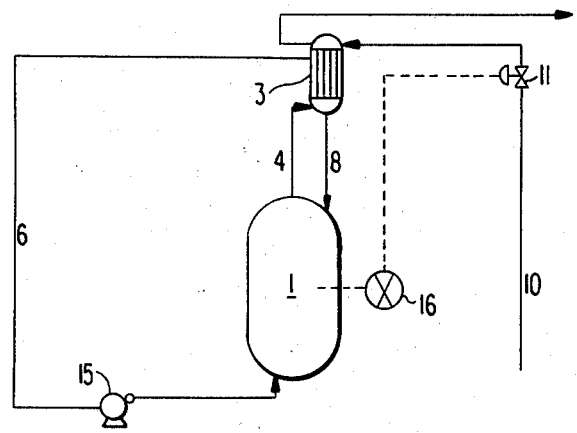
Figure 4:
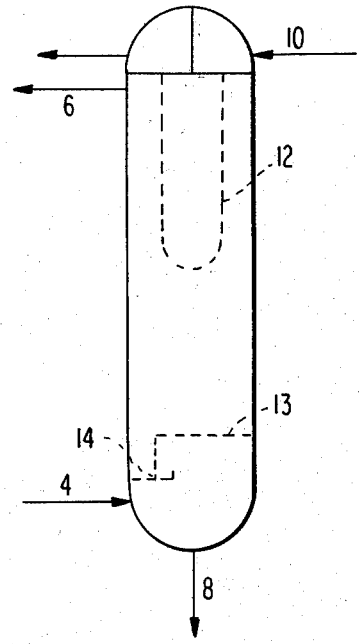

FIG. 3 is a flow diagram of an entire heat removal system from a polymerization reactor, and FIG. 4 shows a sectional view of a vertical multitubular type reflux condenser containing therein the washing apparatus indicated by 3 in FIG. 3 (corresponding to FIG. 1.D).

In the inside of a polymerization reactor 1, an unsaturated hydrocarbon monomer having 2 to 8 carbon atoms, an inert hydrocarbon or the liquefied monomer having 3 to 8 carbon atoms as a solvent, an olefin polymerization catalyst, and hydrogen as a molecular weight regulator are present. As the unsaturated hydrocarbon monomer having 2 to 8 carbon atoms which can be used, there may be used ethylene, propylene, n-butene-1, n-pentene-1, n-hexene-1, 4-methyl pentene-1, n-octene-1 and the like. These monomers can be used alone or in combination thereof. As the solvent which can be used, there may be used an inert hydrocarbon having 3 to 8 carbon atoms such as propane, n-butane, isobutane, isobutylene, n-hexane, n-heptane, xylene and the like. Furthermore, when the unsaturated hydrocarbon monomer other than ethylene to be polymerized is liquid in the polymerization reactor, the monomer other than ethylene can be also used as the solvent. As the olefin polymerization catalyst which can be used, there may be used a catalyst comprising a transition metal compound such as a halogenated titanium compound (e.g., titanium tetrachloride, titanium tetrabromide, titanium trichloride, titanium tribromide, etc.), a halogenated vanadium compound (e.g., vanadyl chloride, vanadium tetrachloride, etc.), chromium oxide or the like, and an organometallic compound of Group Ia, IIa or IIIa of the Periodic Table such as an organoaluminum compound (e.g., diethylaluminum chloride, triethylaluminum, etc.), an organomagnesium compound (e.g., diethyl magnesium) or the like.

The presence of hydrogen as a molecular weight regulator, however, is not always necessary. As the polymerization proceeds, polymerization heat is generated to thereby cause evaporation of the solvent and/or the monomer. The gas phase portion in the polymerization reactor contains the monomer and hydrogen in addition to the gaseous solvent. A gas mixture is withdrawn from the gas phase portion and introduced as a gas to be condensed through a piping 4 into a washing apparatus-containing reflux condenser 3. At this time, active catalyst particles and polymer particles are entrained in the gas mixture.

When the gas mixture enters the washing apparatus-containing reflux condenser 3, it first comes in countercurrent contact with the condensed liquid which has been condensed on the surface of a heat transfer tube 12 of the condenser, on a washing apparatus (tray) 13. The countercurrent contact washes off the active catalyst particles and polymer particles entrained in the gas mixture.

Then, the gas mixture comes in contact with the surface of the heat transfer tube 12 where it is condensed in an amount corresponding to the heat quantity to be removed in the polymerization reactor. The condensed liquid falls on the washing apparatus 13 where it counter-currently contacts with the gas mixture from the polymerization reactor as described above, and it then returns through a piping 8 to the polymerization reactor 1 while containing therein the active catalyst particles and polymer particles.

An uncondensed gas mixture containing the monomer and hydrogen that do not condense on the surface of the heat transfer tube 12 is withdrawn through a piping 6 and circulated with a compressor 15 into the liquid phase portion of the polymerization reactor 1.

As well known to one skilled in the art, the heat quantity to be removed is controlled by regulating the condensation amount in the reflux condenser. The amount of the liquid being condensed can be controlled by the amount of cooling water which is supplied through a piping 10 into the interior of the heat transfer tube 12 of the condenser. The amount of the cooling water is regulated with a control valve 11. The heat quantity being removed nearly corresponds to the polymerization heat generated by the polymerization in the polymerization reactor 1. Thus, the heat removal is carried out by controlling the flow amount of the cooling water so that the temperature of the polymerization reactor 1 is maintained at a constant level.

Although the above explanation has been made to a vertical type multitubular reflux condenser containing therein a washing apparatus, this invention is not limited thereto. The constructions as illustrated in FIGS. 1 and 2 can easily be employed in this invention.

This invention is described in greater detail by reference to the following Example and Comparative Example.

EXAMPLE

Polymerization was carried out according to a flow diagram shown in FIG. 3. The removal of polymerization heat was carried out using an apparatus shown in FIG. 4.

Polymerization Reactor: 30 $m^3$ polymerization reactor with a stirrer

Reflux Condenser: vertical type of U-shaped multitubular reflux condenser (heat transfer area: 40 $m^3$)

Washing Apparatus: 1-stage turbogrid tray with a down comer which is contained in the lower portion of the reflux condenser Monomer and Solvent: propylene Polymerization Catalyst: titanium trichloride and diethylaluminum chloride (feed amount: 156 g/hr and 1,000 g/hr, respectively)

Molecular Weight Regulator: hydrogen

Temperature of Polymerization Reactor: 70° C.

Pressure of Polymerization Reactor: 31 kg/cm$^2$ (Gauge)

The operation was continued for 8 months under the above conditions. Under these conditions, a slurry of polymer produced was discharged from the reactor at an average rate of 2,350 kg/hr. The slurry comprised a solid polymer (1,250 kg/hr in average), and liquid propylene containing atactic polymer and dissolved catalyst (1,100 kg/hr in average). The quantity of heat removal on the reflux condenser was about 400,000 Kcal/hr.

At the end of the time, the reflux condenser was dismantled and inspected. This inspection revealed that almost no deposition of polymer particles, catalyst particles, etc., on the surface of the heat transfer tube took place. It was observed that the polymer deposited in a thickness of about 6 mm on the walls of the inlet piping through which the gas mixture was introduced into the polymerization reactor.

COMPARATIVE EXAMPLE

The procedure of the Example was repeated with the exception that the washing apparatus (tray 13 and down comer 14) was not provided.

The operation was continued for 33 days. At the end of the time, the reflux condenser was dismantled and inspected. The polymer containing catalyst particles had deposited onto the whole surface of the heat transfer tube and its thickness was about 0.1 mm to 10 mm.

While the invention has been described in detail and with reference to specific embodiments thereof, it will be apparent to one skilled in the art that various changes and modifications can be made therein without departing from the spirit and scope thereof.

What is claimed is:

1. In a method of the heat removal from a polymerization reactor with a reflux condenser, wherein an unsaturated hydrocarbon monomer having 2 to 8 carbon atoms is polymerized in an inert hydrocarbon or in the liquefied monomer having 3 to 8 carbon atoms as a solvent, in the presence of an olefin polymerization catalyst, by introducing a gas mixture withdrawn from the polymerization reactor into the reflux condenser where the gas mixture is condensed and separated into a condensed liquid and an uncondensed gas and returning the condensed liquid to the polymerization reactor and the uncondensed gas into the liquid phase in the polymerization reactor by the use of a compressor, the improvement comprising washing the gas mixture by bringing it into countercurrent contact with at least one of the condensed liquid obtained in the reflux condenser and the solvent to be supplied to the polymerization reactor, after it leaves the polymerization reactor and before it reaches the heat transfer surface of the reflux condenser.

* * * * *